(12) United States Patent  
Taylor

(10) Patent No.: US 6,470,294 B1
(45) Date of Patent: Oct. 22, 2002

(54) SYSTEM AND METHOD FOR THE ON-LINE MEASUREMENT OF GLUE APPLICATION RATE ON A CORRUGATOR

(75) Inventor: Bruce F. Taylor, Worthington, OH (US)

(73) Assignee: Qualitek-VIB, Inc., Tucker, GA (US)

( * ) Notice: Subject to any disclaimer, the term of this patent is extended or adjusted under 35 U.S.C. 154(b) by 0 days.

(21) Appl. No.: 09/547,480

(22) Filed: Apr. 12, 2000

Related U.S. Application Data

(60) Provisional application No. 60/129,110, filed on Apr. 13, 1999.

(51) Int. Cl.$^7$ .................................................. G01B 11/06
(52) U.S. Cl. ......................................... 702/172; 702/170
(58) Field of Search ............................ 156/64; 250/339, 250/339.11; 354/304; 356/304, 357, 497

(56) References Cited

U.S. PATENT DOCUMENTS

| | | | | | |
|---|---|---|---|---|---|
| 3,319,515 A | * | 5/1967 | Flournoy | .................... | 356/497 |
| 4,254,337 A | * | 3/1981 | Yasujima et al. | ............ | 250/339 |
| 4,319,827 A | * | 3/1982 | Carter et al. | ................. | 354/304 |
| 4,421,983 A | * | 12/1983 | Fogle et al. | ................ | 250/339 |
| 4,456,379 A | * | 6/1984 | Schumann et al. | ......... | 356/381 |
| 5,049,216 A | * | 9/1991 | Shead et al. | .................. | 156/64 |
| 5,473,432 A | * | 12/1995 | Sorin | ......................... | 356/357 |
| 5,663,565 A | * | 9/1997 | Taylor | .................... | 250/339.11 |
| 6,067,161 A | * | 5/2000 | Marcus et al. | .............. | 356/357 |
| 6,172,752 B1 | * | 5/2000 | Haruna et al. | .............. | 356/357 |

\* cited by examiner

*Primary Examiner*—Kamini Shah
*Assistant Examiner*—Douglas N Washburn
(74) *Attorney, Agent, or Firm*—Hale and Dorr LLP

(57) ABSTRACT

The system and method of the present invention determines the rate of application of liquid glue to corrugated board on a corrugator. A sensor employing the principle of infrared absorption measures the amount of water on the surface of the glue roll upstream of the point of application of the glue to the corrugated board's medium. A second sensor employing the principle of infrared absorption measurers the amount of water on the surface of the glue roll downstream of the point of application of the glue to the corrugated board's medium. Using calibration coefficients the two sensor's output signals are then converted into film thickness measurements. The downstream film thickness measurement is then subtracted from the upstream film thickness measurement to compute the reduction in film thickness caused by the intervening application of the glue to the medium.

11 Claims, 8 Drawing Sheets

SYSTEM AND METHOD FOR THE ON-LINE MEASUREMENT OF GLUE APPLICATION RATE ON A CORRUGATOR

This application claims the benefit of provisional application No. 60/129,110 filed on Apr. 13, 1999.

BACKGROUND OF THE INVENTION

This invention relates to a system and method for measuring the rate of application of liquid glue during the manufacture of corrugated board.

In the manufacture of corrugated board a layer of paper referred to as the medium is first passed between two metal, heated and toothed, corrugating rolls that form it into a sinusoidal, fluted shape. A topside layer of paper referred to as the top liner is then bonded with an aqueous, starch-based glue solution to the topside tips of the medium's flutes. This initial fluting and bonding process is typically referred to as singlefacing, and takes place in an area of the corrugating machine that is typically referred to as the singlefacer.

During singlefacing the glue is first delivered to the singlefacer's glue pan through which rotates a glue roll. Glue picked up by this glue roll is then metered off by an adjacent metering roll. The gap between this glue roll and metering roll, which is typically referred to as the singlefacer metering roll gap, may be adjusted to produce a specific glue roll film thickness and resulting topside glue application rate. After the glue is applied the medium is held in contact with the top liner for a brief interval by a suitable loading element, such as a pressure roll or loading belt, to produce the bonded, two-layer, singleface web.

The underside of the singleface web's flutes are then bonded to a second liner, typically referred to as the bottom liner, to form the final three-layer, corrugated board product. This final glue application and bonding process, which is typically referred to as doublefacing, takes place in an area of the corrugating machine that is typically referred to as the glue-machine or glue-unit.

During doublefacing the glue is first delivered to the glue-machine's glue pan, through which rotates a glue roll. Glue picked up by this glue roll is then metered off by an adjacent metering roll. The gap between this glue roll and metering roll, which is typically referred to as the double-facer metering roll gap, may be adjusted to produce a specific glue roll film thickness and resulting bottom-side glue application rate. During this bottom-side glue application the medium's flutes are typically held in contact with the glue roll by an adjacent rider roll or spring-loaded contact bar that is pressed lightly against the top of the singleface web. Then, after the glue is applied to the underside of the medium's flutes, the medium is subsequently pressed against the incoming bottom liner to initiate the bottom-side bond and complete formation of the three-layered corrugated board.

Some corrugating machines have two or more singlefacers, to form two or more singleface webs, which when bonded together, and to a final bottom liner, permit the formation of a five or more layered corrugated board.

To produce consistent, optimum corrugated board quality, to minimize raw material costs, and to maximize production speeds, glue application rates must be controlled to minimum target levels (across the machine's width), at both the singlefacer and glue-machine.

Producing well-bonded corrugated board to minimize scrap due to delamination requires consistent, uniform glue application to ensure adequate coverage. Producing flat, pliable corrugated board to minimize scrap due to dimensional warp and cracked score lines, requires optimum board moisture levels that also depend upon consistent glue application rates. The paper used to produce corrugated board typically contains about 6.5% water by weight. The paper in a representative three-layer board with a total raw material weight about 120 lbs/1,000 square feet, thus contains close to 8 lbs of water per 1,000 square feet of board. The minimal amount of glue applied to a board of this weight is about 10 lbs of liquid glue per 1,000 square feet, of which about 25% is solids (starch and additives, such as borax) and 75% water (7.5 lbs/1,000 square feet). An application rate of 50 to 100% higher than this is also not uncommon. As indicated by this representative example the amount of water added to the process with the glue is similar and often greater than that entering the process with the paper. Consequently, effective control of final corrugated board moisture requires not only consistent paper moisture levels, but also control of the glue application rate.

A representative corrugating plant produces about 70 million square feet of board per month. This equates to roughly 50,000 tons of board per year, including over 1,000 tons of starch (solids). In this example about 3,000 tons of water per year, introduced along with the starch, would have to be subsequently evaporated from the board during contact with steam-heated vessels. Even a modest 10% reduction in glue consumption, made possible by the on-line measurement and control of the glue application rate, would reduce this representative corrugating plant's glue purchases by 100 tons per year, and it's steam consumption rate by over 300 tons per year.

The conventional means to control and minimize the glue application rate is to control the primary variables, the metering roll gaps, to empirical dimensional targets, to achieve approximate control of the top and bottom-side glue application rates. However, glue application rates are also affected by numerous secondary factors such as the medium's physical properties (i.e. permeability), the glue's characteristics (i.e. viscosity), the machine speed (which affects the amount of glue that is forced through a given metering roll gap), and the gap between the glue roll and the medium's flute tips. An on-line, direct measurement of the glue application rate is needed to facilitate control of the glue application rate to optimum targets, using closed-loop feedback control of the metering roll gaps.

Machine speed on a corrugator varies frequently, often from as high as 800 feet per minute, down to 300 feet per minute, and back up, in less than a minute. Such rapid changes in speed produce concurrent, rapid changes in the glue application rate. To enable closed-loop control of the glue application rate throughout speed changes rapid measurement updates are needed, preferably every second or fraction of a second.

To date, no on-line, direct, rapid measurement of the glue application rate method has been successfully commercialized. U.S. Pat. No. 5,049,216 describes the basic principles of an infrared absorption sensor that with the proper selection of appropriate optical filters and light-sensitive detectors may be used to measure the adjacent quantities of certain organic materials, such as water, cellulose fiber, and starch. However, U.S. Pat. No. 5,663,565 indicates that the basic principle of infrared absorption cannot be used, without enhancement, to directly measure the amount of starch on the board, because the primary absorption bands for starch are the same as for cellulose fiber and because the water in the starch is indistinguishable from the water in the paper. U.S. Pat. No. 5,663,565 subsequently discloses an enhancement that allows the starch component of a direct infrared absorption measurement to be distinguished from the background measurement of the paper's cellulose fiber and water, by exploiting the fact that the starch component of the measurement oscillates at the fluting frequency. However, the method proposed in U.S. Pat. No. 5,663,565 requires complex signal processing and a small light spot size that is tightly focused, depth-wise, on the flute tips, to prevent the undulating medium's depth-sensitive fiber and water signatures from corrupting the measurement.

It is therefore a principle object of the present invention to provide a system and method for measuring the glue application rate on corrugated board.

It is a further object of the present invention to measure the glue application rate on corrugated board during the manufacture of such corrugated board.

SUMMARY OF THE INVENTION

Accordingly the system and method of the present invention uses common infrared sensor technology to successfully measure the rate at which glue is applied to corrugated board on a corrugator. This is achieved by first measuring the thickness of the aqueous glue film on the glue roll, both upstream and downstream of the point of application of the glue to the medium, using a pair of co-linear infrared absorption sensors, and then by subtracting the downstream value from the upstream one to derive the glue consumption or application rate.

The system and method of the present invention includes a first infrared absorption sensor that is located so as to measure the thickness of the aqueous glue film on the glue roll upstream of the where the glue film contacts the medium's flutes. The point where the glue film contacts the medium's flutes shall hereinafter be referred to as the gluing nip, and the upstream sensor shall hereinafter be referred to as the upstream sensor. The system and method of the present invention also includes a second infrared absorption sensor that is located so as to measure the thickness of the aqueous glue film on the glue roll just downstream of the gluing nip. This downstream sensor shall hereinafter be referred to as the downstream sensor.

The upstream and downstream sensors both measure the respective upstream and downstream films in the same manner. The preferred sensor design incorporates a light source to illuminate the glue film, a beam splitter to split the returning light into two paths, one band-pass filter for each light path to restrict each filtered light beam to a chosen narrow band-width, and one light-sensitive detector downstream of each band-pass filter to measure the intensity of the respective filtered light.

One band-pass filter is chosen to pass light in a narrow bandwidth that is heavily and uniquely absorbed by the water in the glue. The second band-pass filter is chosen to pass light within a second narrow bandwidth that is effectively not absorbed by either the water or the solids in the glue. The first detector, which shall hereinafter be referred to as the water-channel detector, produces an electrical output signal whose magnitude is inversely proportional to the amount of water in the glue film, which in turn is proportional to the glue film's thickness. This first channel's output signal is also generally proportional to the water-channel detector's temperature that affects its signal gain, inversely proportional to the optical scattering effects of the glue film, and directly proportional to the intensity of the light source. The second detector, which shall hereinafter be referred to as the reference-channel detector, produces an electrical output signal whose magnitude is essentially only proportional to its temperature, inversely proportional to the optical scattering effects of the glue film, and directly proportional to the intensity of the light source.

The first step in the preferred signal processing method then computes the ratio of each sensor's two detector output signals to derive a normalized, initial measurement value for each sensor. These two normalized, initial measurement values are thus essentially insensitive to changes in the internal temperature of each sensor, the scattering effects of the upstream and downstream glue films, and the intensity of the two sensor's light sources. The resulting normalized, initial measurement values therefore effectively vary only with the amount of water in the upstream and downstream glue films, and hence only with the thicknesses of the upstream and downstream glue films.

Each sensor's normalized, initial measurement value is then linearized by suitable means, such as by computing its logarithm, then multiplied by an empirically determined slope or gain, and finally added to an empirically determined offset value, to derive each sensor's final calibrated measurement value. Suitable slopes and offsets are empirically determined by routine calibrations that compare manually measured glue film thicknesses to on-line sensor measurements.

The downstream sensor's final calibrated measurement value is then subtracted from the upstream sensor's final calibrated measurement value to derive the reduction in film thickness that results from the intervening application of glue to the medium's flute tips. The computed reduction in glue film thickness is then multiplied by a constant that takes into account the assumed density and consistency (percent-solids) of the liquid glue to derive an intermediate solids consumption rate, defined as the weight of solid starch consumed per unit length of the glue roll's circumference. The computed intermediate solids consumption rate is then multiplied by the measured rotational speed of the glue roll, in revolutions per unit time, and then by the known circumference of the glue roll, to compute the solids application rate, defined as the weight of solid starch applied to the medium's flute tips per unit time. The measured machine speed is then multiplied by the known width of the manufactured corrugated board to compute the board production rate, defined as the surface area of board produced per unit time. The solids application rate is then multiplied by the computed board production rate to compute the final glue application rate, in weight of solid starch applied per unit surface area of board produced.

The final measured glue application rate may be derived using a fixed pair of co-linear sensors located at one measurement location, at a suitable position across the width of either the singlefacer or glue-machine, to provide a single measurement of the glue application rate versus time on just one side of the corrugated board. A second set of co-linear sensors may be located at another measurement location to derive a similar second fixed-point measurement of the glue application rate versus time on the other side of the corrugated board. At either measurement location an array of co-linear sensors across the width of the machine may alternatively be used to derive a discrete number of starch application measurements across the width of the singlefacer or glue-machine, so as to measure the cross-machine uniformity of the glue application. In still another arrangement, at any measurement location a pair of co-linear sensors may be mounted to a pair of synchronized scanning devices to mechanically convey the co-linear sensor pair back and forth across the width of the corrugating machine. This scanning arrangement therefore facilitates the derivation of essentially continuous glue application profiles across the width of the machine, to further improve the measurement of cross-machine glue uniformity.

These and other features and objects of the present invention will be more fully understood from the following detailed description, which should be read in light of the accompanying drawings in which corresponding reference numerals refer to corresponding parts through the several views.

DETAILED DESCRIPTION OF THE DRAWINGS

Figure 1:
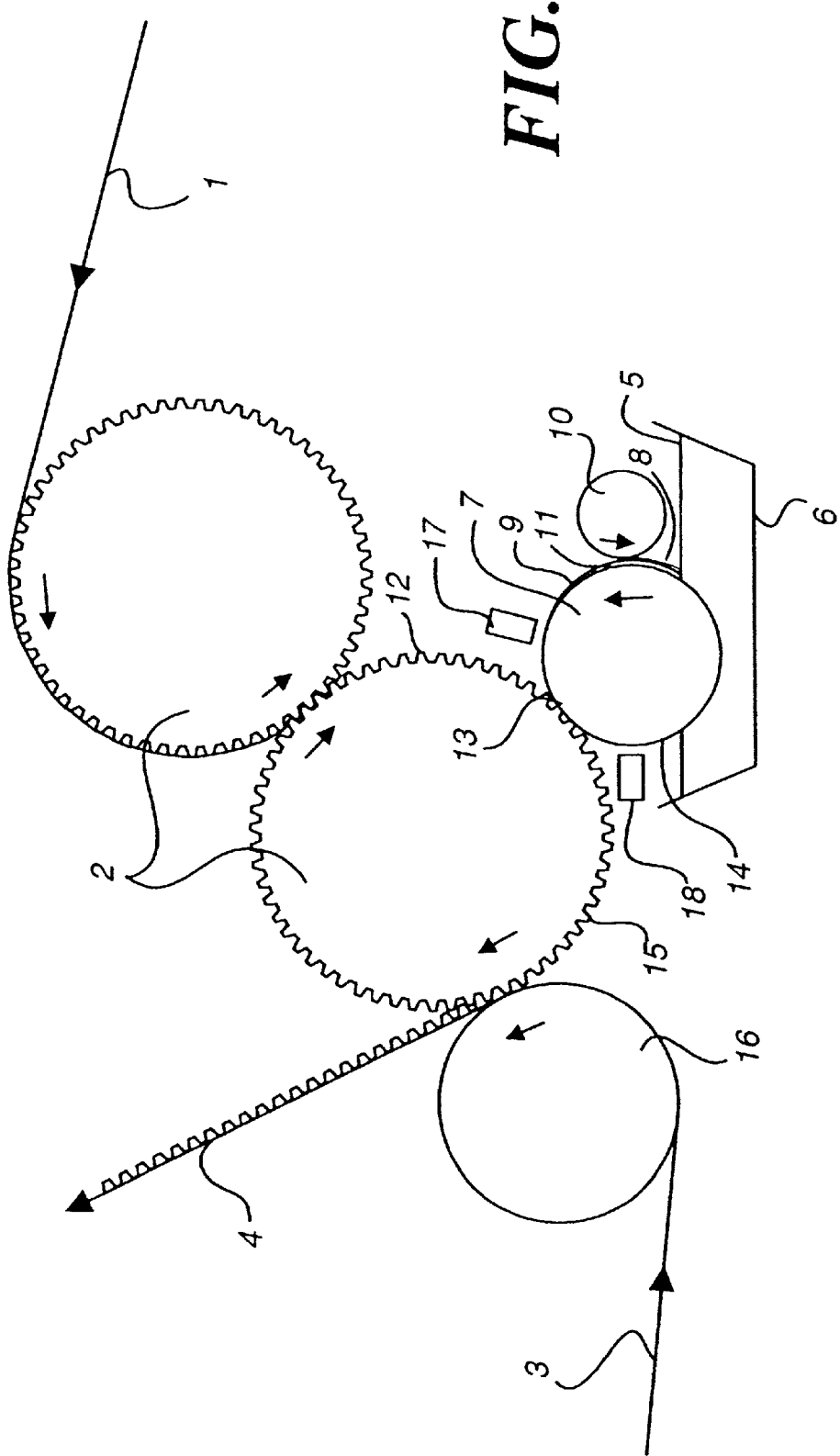
FIG. 1 is a side elevational view of a conventional pressure-roll singlefacer, showing the medium being fluted and subsequently bonded to the top-liner, and the preferred placement of the upstream and downstream sensors utilized by the system and method of the present invention.

Referring now to FIG. 1 the first step in the manufacture of corrugated board is the singlefacing process wherein the medium 1 is fluted between two metal, toothed corrugating rolls 2 then bonded to the top-liner 3 to form the singleface web 4. The top liner 3 is bonded to the tips of the fluted medium 1 using an aqueous, starch-based glue 5 that is fed into a full-width glue pan 6 through which rotates a metal glue roll 7. A liquid glue film 8 forms on the glue roll 7 as it rotates through the glue pan 6, then the glue film 8 is metered down to a controlled upstream glue film 9 by a metal metering roll 10 that typically rotates counter to the direction of rotation of the glue roll 7. The thickness of the upstream glue film 9 is controlled by adjusting the gap 11 between the metering roll 10 and the glue roll 7.

The upstream glue film 9 then comes into contact with the medium's flute tips 12 in the gluing nip 13 where some of it is picked up by the medium's flute tips 12, leaving a thinner, residual, downstream glue film 14 on the downstream side of the gluing nip 13. As the fluted, glued medium 15 rotates around the lower of the two corrugating rolls 2 it is typically pressed against the top-liner 3 by a metal pressure roll 16. Upon contact between the fluted, glued medium 15 and the top-liner 3 the starch bond begins to form between the two layers, producing a glued singleface web 4.

Referring still to FIG. 1, the system and method of the present invention employs an upstream infrared absorption sensor 17 and a downstream infrared absorption sensor 18 to measure the thicknesses of the upstream glue film 9 and the downstream glue film 14, respectively.

Figure 2:
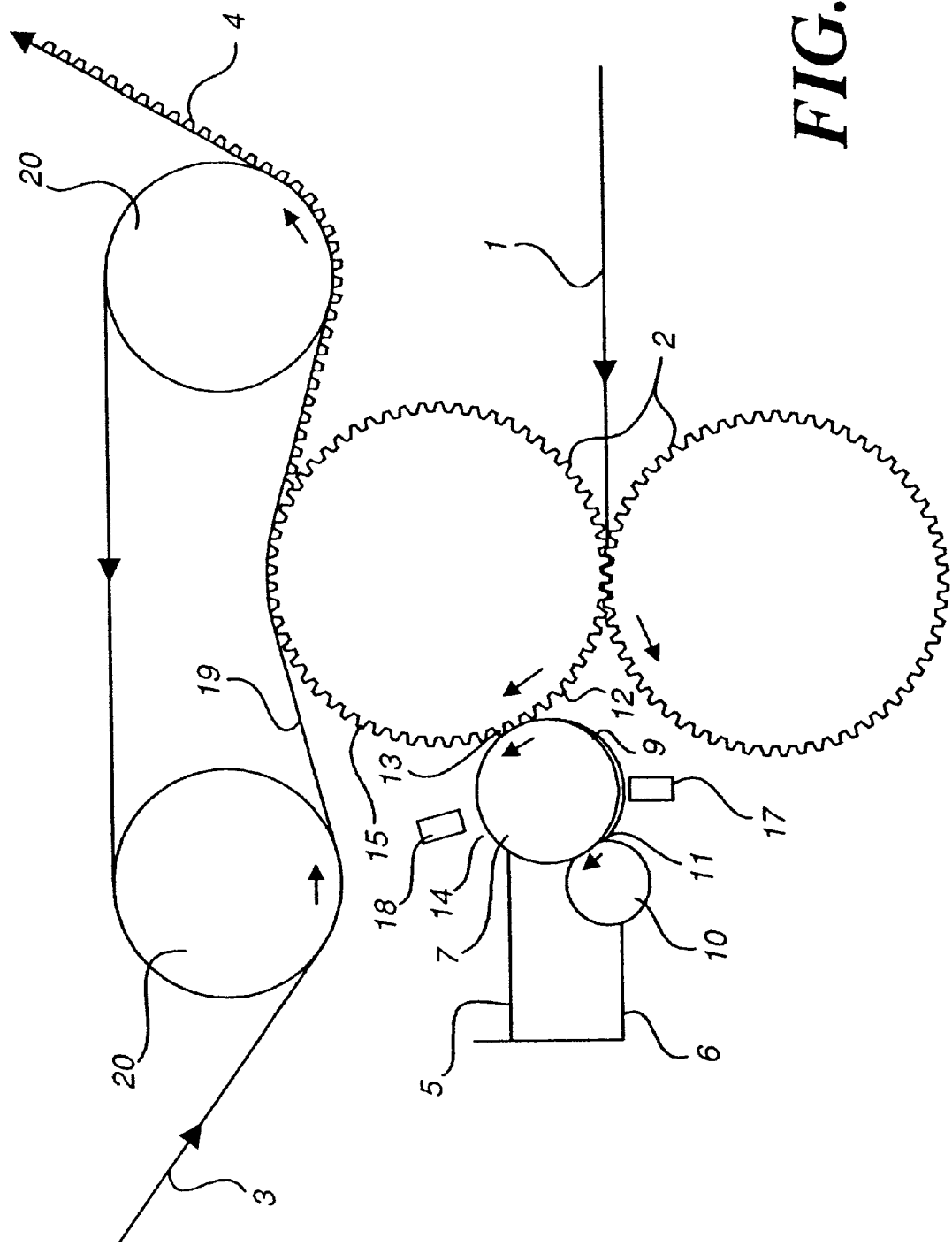
FIG. 2 is a side elevational view of a belted singlefacer, showing the medium being fluted and subsequently bonded to the top-liner, and the preferred placement of the upstream and downstream sensors utilized by the system and method of the present invention.

Referring now to FIG. 2, various singlefacer designs may be used to bond the fluted, glued medium 15 to the top-liner 3. In a second, common singlefacer design a pressure belt 19, that rotates around two guide rolls 20, is employed to press the fluted, glued medium 15 against the top-liner 3 to form the singleface web 4. In this second, common singlefacer arrangement the medium 1 is again fluted between two metal, toothed corrugating rolls 2 and the top liner 3 is again bonded to the tips of the fluted medium 1 using an aqueous, starch-based glue 5 that is fed into a full-width glue pan 6 through which rotates a metal glue roll 7. In this arrangement a liquid glue film is also formed on the glue roll 7 as it rotates through the glue pan 6, and the glue film is again metered down to a controlled upstream glue film 9 by a metal metering roll 10 that typically rotates counter to the direction of rotation of the glue roll 7. The thickness of the upstream glue film 9 is again controlled by adjusting the gap 11 between the metering roll 10 and the glue roll 7.

The upstream glue film 9 then comes into contact with the medium's flute tips 12 in the gluing nip 13 where some of it is picked up by the medium's flute tips 12, leaving a thinner, residual, downstream glue film 14 on the downstream side of the gluing nip 13. As the fluted, glued medium 15 rotates around the upper of the two corrugating rolls 2 it is pressed against the top-liner 3 by the pressure belt 19. Upon contact between the fluted, glued medium 15 and the top-liner 3 the starch bond begins to form between the two layers, producing a glued singleface web 4.

Referring still to FIG. 2, the system and method of the present invention when applied to a belted singlefacer still employs an upstream infrared absorption sensor 17 and a downstream infrared absorption sensor 18 to measure the thicknesses of the upstream glue film 9 and the downstream glue film 14, respectively.

Figure 3:
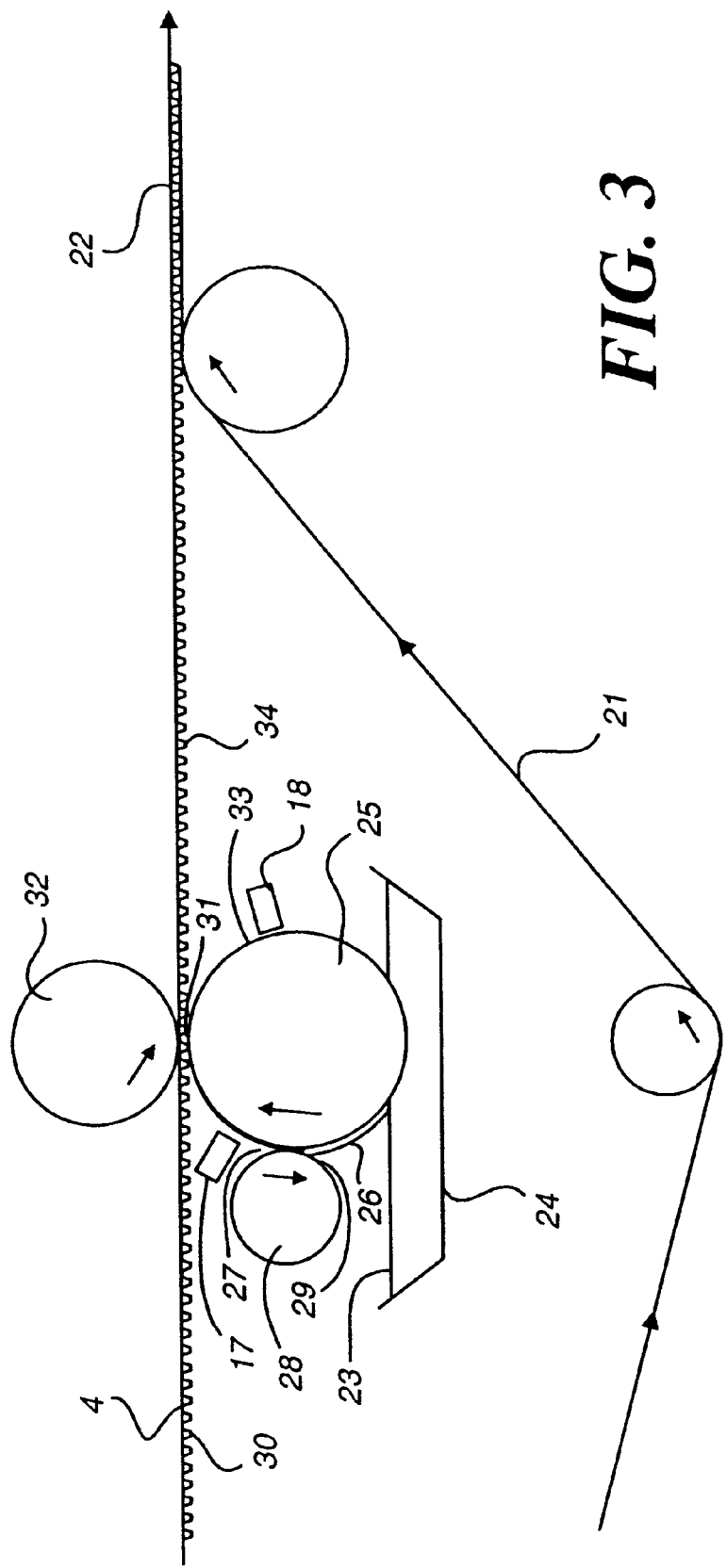
FIG. 3 is a side elevational view of a typical glue-machine, showing the glue being applied to the medium's flute tips prior to bonding to the bottom liner, and the preferred placement of the upstream and downstream sensors utilized by the system and method of the present invention.

Referring now to FIG. 3 the second step in the manufacture of corrugated board is the doublefacing process that takes place in the glue-machine wherein the singleface web 4 is bonded to the bottom liner 21 to form the final, corrugated board 22. In the glue-machine aqueous, starch-based glue 23 is fed into a full-width glue pan 24 through which rotates a metal glue roll 25. A liquid glue film 26 forms on the glue roll 25 as it rotates through the glue pan 24, then the glue film 26 is metered down to a controlled upstream glue film 27 by a metal metering roll 28 that typically rotates counter to the direction of rotation of the glue roll 25. The thickness of the upstream glue film 27 is controlled by adjusting the gap 29 between the metering roll 28 and the glue roll 25.

The upstream glue film 27 then comes into contact with the underside of the singleface web's flute tips 30 in the gluing nip 31, where the singleface web 4 is held in contact against the glue roll 25 by a top-side rider roll 32 or spring-loaded contact bar. In the gluing nip 31 some of the upstream glue film 27 is picked up by the singleface web's flute tips 30, leaving a thinner, residual, downstream glue film 33 on the downstream side of the gluing nip 31. After the glued singleface web 34 leaves the gluing nip 31 it is then contacted by the bottom liner 21 to form the final corrugated board 22.

Referring still to FIG. 3, the system and method of the present invention employs an upstream infrared absorption sensor 17 and a downstream infrared absorption sensor 18 to measure the thicknesses of the upstream glue film 27 and the downstream glue film 33, irrespectively.

Figure 4:
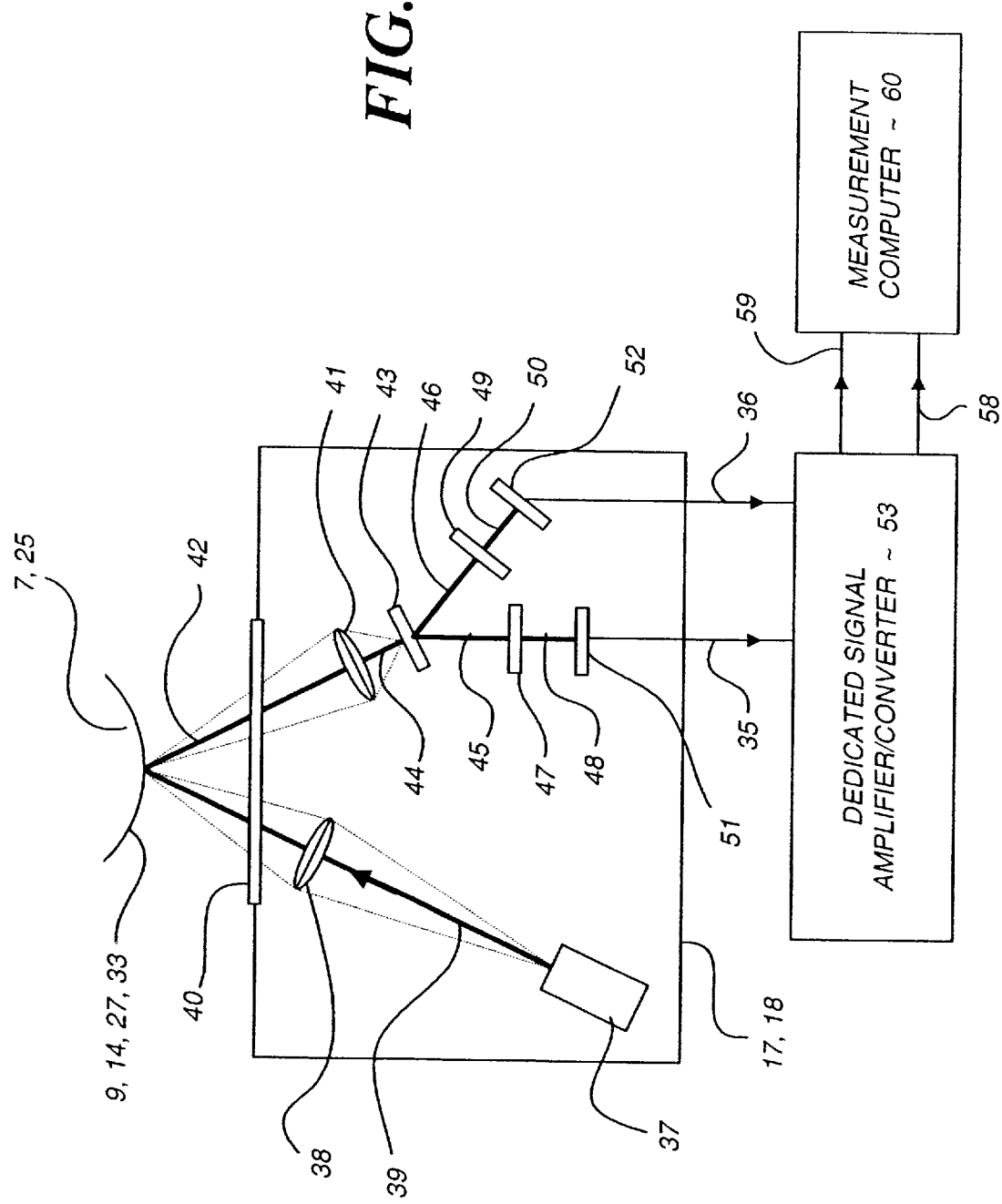
FIG. 4 is a schematic view of an infrared absorption sensor whose output signal is utilized in the system and method of the present invention.

Referring now to FIGS. 1, 2 and 4 the system and method of the present invention uses two identical infrared absorption sensors 17 and 18 (only one such sensor is illustrated in FIG. 4) to measure the thickness of the upstream 9 and downstream 14 glue films at the singlefacer.

Referring now to FIGS. 3 and 4 the system and method of the present invention similarly uses two identical infrared absorption sensors 17 and 18 to measure the thickness of the upstream 27 and downstream 33 glue films at the glue-machine.

Referring now to FIG. 4 the infrared absorption sensor 17, 18 whose output signals 35, 36 are utilized in the system and method of the present invention incorporates a infrared lamp 37 to illuminate the glue film 9, 14, 27, 33 on the glue roll 7, 25, a focusing lens 38 to collimate the diffuse source beam 39, a transparent window 40 to protect the sensor 17, 18 from the ambient environment, a second focusing lens 41 to collimate the returning, diffuse light beam 42, an optical beam splitter 43 to split the collimated, returning light beam 44 into two paths 45, 46, a first optical band-pass filter 47 to restrict the first filtered light beam 48 to a chosen narrow band-width, a second optical band-pass filter 49 to restrict the second filtered light beam 50 to a second chosen narrow band-width, a first light-sensitive detector 51 to measure the intensity of the first filtered light beam 48, a second light-sensitive detector 52 to measure the intensity of the second filtered light beam 50, and a dedicated signal amplifier/converter 53 to initially process the low-voltage electrical output signals 35, 36 produced by the two light-sensitive detectors 51, 52.

Figure 5:
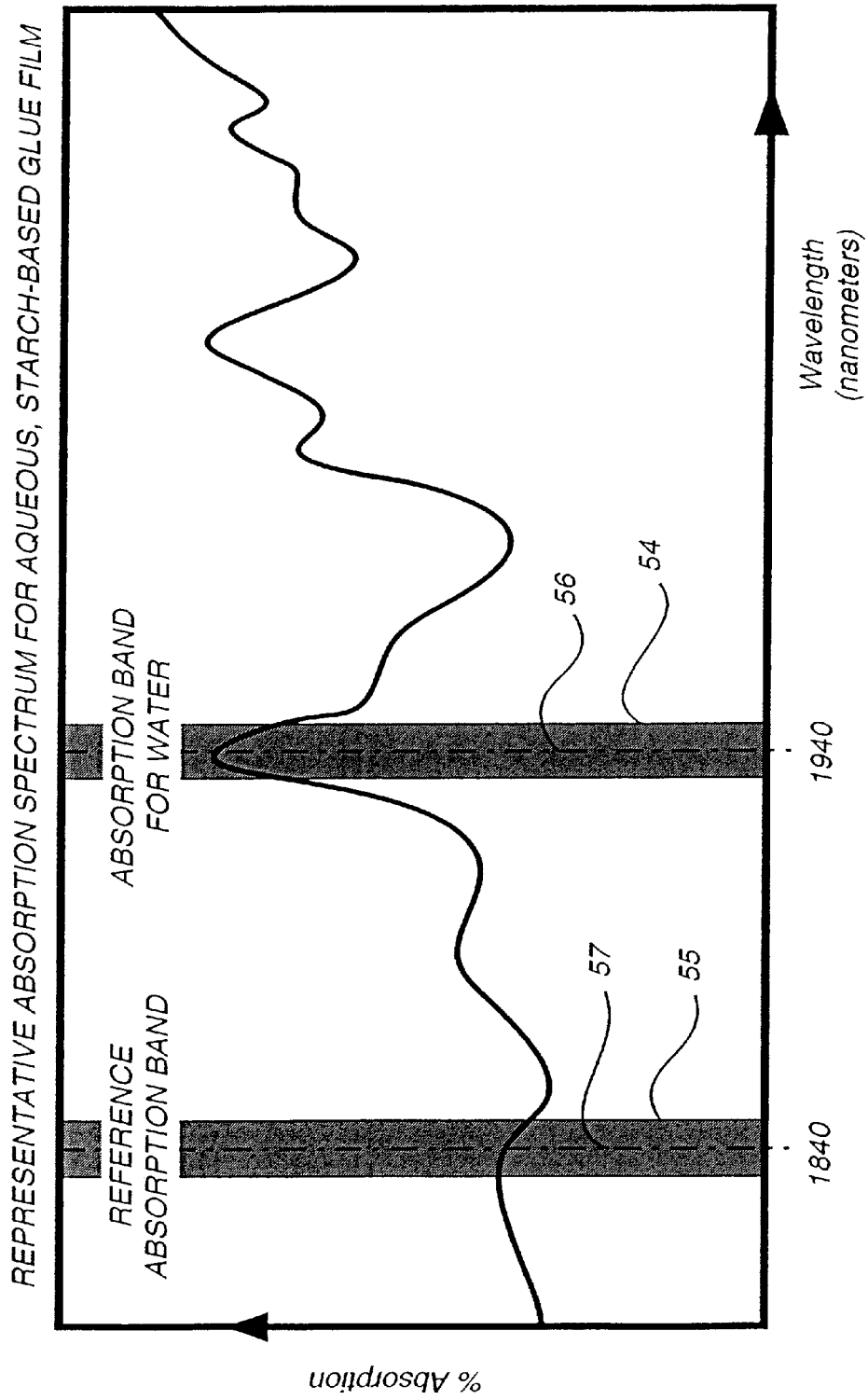
FIG. 5. is a graphical illustration of the infrared absorption spectrum for the measured glue film.

Referring now to FIGS. 4 and 5, the first and second optical band-pass filters 47, 49 are designed such that the breadth of each filtered light beam's passband 54, 55 is typically limited to about ±20 nanometers, such that the light beams 48, 50 incident upon the detectors 51, 52 are effectively monochromatic. The first light beam 45 is filtered by a filter 47 that is chosen to pass light 48 within a water absorption band 54 centered about wavelength 56 which is approximately 1940 nanometers, at which the percent absorption is very sensitive to the amount of water in the glue film 9, 14, 27, 33. The second light beam 46 is filtered by a filter 49 that is chosen to pass light 50 within a reference absorption band 55 centered about wavelength 57 which is approximately 1840 nanometers, at which the percent absorption is very insensitive to both the amount of water and solids that is in the glue film 9, 14, 27, 33. As indicated above the preferred measurement wavelengths 56, 57 are typically 1940 and 1840 nanometers, respectively, but slight shifts may be required to achieve optimum results.

The electrical outputs 35, 36 of each detector 51, 52 therefore represent the intensity of the focused, reflected light 44 at each chosen wavelength 56, 57. These low-voltage electrical outputs 35, 36 may then be amplified and converted into two more conventional electrical analog signals 58, 59, such as 4–20 milliamp or 0–10 VDC signals, using a dedicated signal amplifier/converter 53, prior to being further processed by a measurement computer 60.

Referring to FIGS. 1, 2, 3, 4 and 6 the measured thickness of the upstream 9, 27 and downstream 14, 33 glue films at either the singlefacer or glue machine may then be derived from each sensor's original detector outputs 35, 36 using an appropriate set of identical computations performed in the measurement computer 60. These computations combine the outputs of each sensor's two detectors 51, 52 to derive an empirical result which is calibrated to represent the thickness of the measured glue film 9, 14, 27, 33. In the initial computation the amplified and converted output 58 of one detector 51 is divided by the amplified and converted output 59 of the other detector 52 to produce a normalized intermediate result that is exclusively proportional to the water content of the glue film 9, 14, 27, 33. This procedure also compensates for fluctuations in the intensity of the source beam 39, the influence of the detector's temperatures on their signal gains, the optical scattering effects of the glue film 9, 14, 27, 33, and contamination of the sensor's common optical components 38, 40, 41, 43. A suitable set of computations that may be employed to compute the glue film thickness is:

$$R = Z_W / Z_T$$

$$Y = \log(R)$$

$$T_g = (A \times Y) + B$$

Where;

$Z_W$ is the amplified and converted output signal 58 of the water detector 51

$Z_T$ is the amplified and converted output signal 59 of the reference detector 52

R is the ratio of the amplified and converted output signals 58, 59

$T_g$ is the computed glue film thickness measurement value for each sensor 61, 62

A and B are empirical constants which are determined by calibration tests that compare manually-measured, known glue film thicknesses to the on-line sensor measurements. The value of these constants may be optimally determined using common linear regression techniques.

Figure 6:
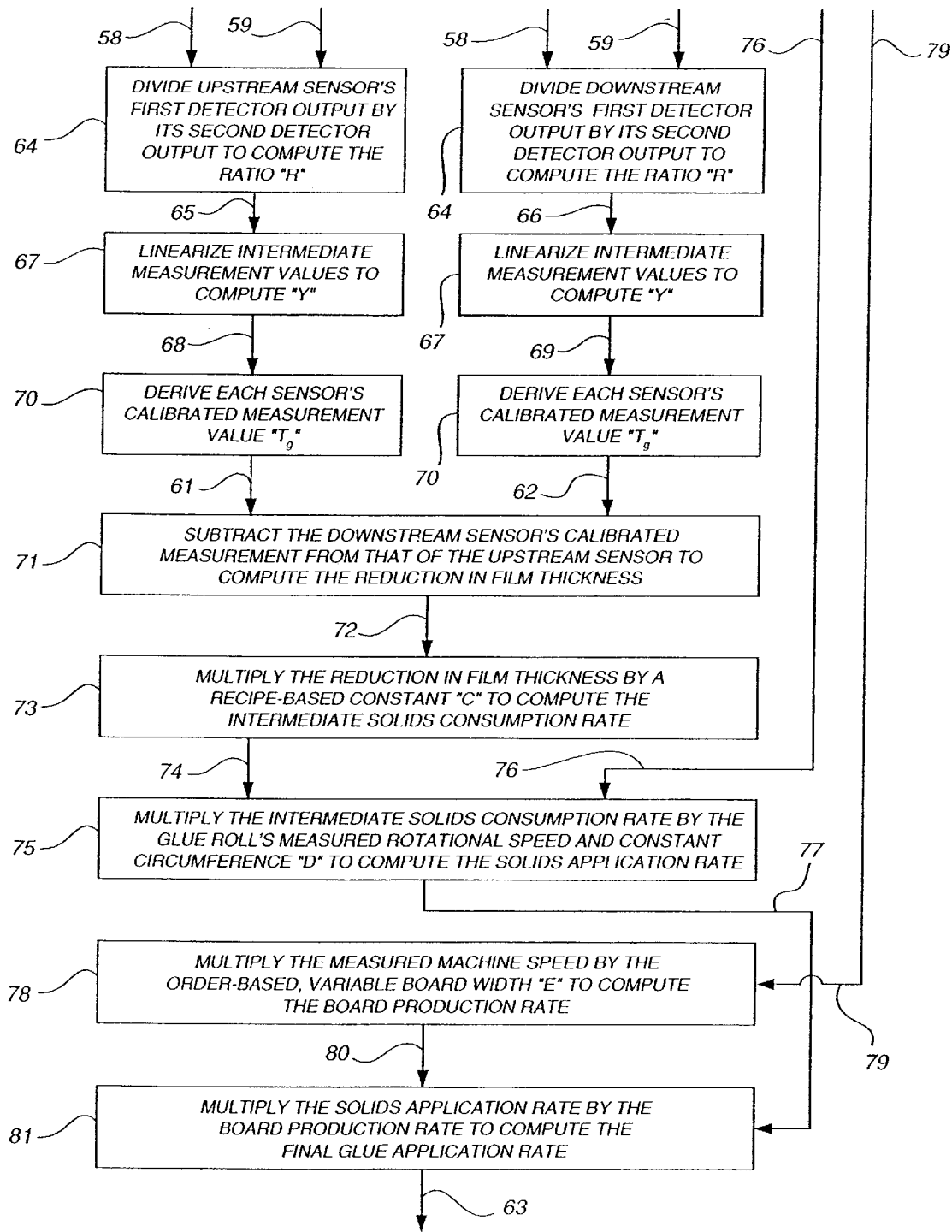
FIG. 6 is a flow chart of the steps performed by the method of the present invention to determine the glue application rate.

Referring now to FIGS. 4 and 6, the resulting computed film thickness measurements "$T_g$" 61, 62 produced by each pair of co-linear sensors 17, 18 may then be combined and converted into a more useful measurement of the glue application rate 63 by executing additional computational steps in the measurement computer 60.

As noted above, and as illustrated in FIG. 6, the first step 64 in the preferred signal processing method is to compute the ratio "R" of each sensor's two amplified and converted detector output signals 58, 59, to derive a normalized, intermediate god measurement value 65, 66 for each sensor 17, 18.

In the second step 67 each sensor's normalized, intermediate measurement value 65, 66 is then linearized by suitable means, such as by computing its logarithm, to compute a second intermediate measurement value "Y" 68, 69 for each sensor 17, 18.

In the third step 70 each sensor's second intermediate value 68, 69 is multiplied by an empirically-determined slope or gain "A", and finally added to an empirically-determined offset value "B", to derive each sensor's final calibrated measurement value "$T_g$" 61, 62. Such suitable slopes and offsets are empirically determined by routine calibrations that compare manually measured glue film thicknesses to on-line sensor measurements.

In the fourth step 71 the final calibrated measurement value 62 for the downstream sensor 18 is then subtracted from the final calibrated measurement value 61 for the upstream sensor 17 to derive the reduction in film thickness 72 that results from the intervening application of the glue to the medium's flute tips.

In the fifth step 73 the computed reduction in glue film thickness 72 is then multiplied by a constant "C", that is dependent on the glue recipe, that takes into account the known, assumed density and consistency (percent-solids) of the liquid glue to derive an intermediate solids consumption rate 74, defined as the weight of solid starch consumed per unit length of the glue roll's circumference.

In the sixth step 75 the computed intermediate solids consumption rate 74 is then multiplied by the measured rotational speed 76 of the glue roll 7, 25 in revolutions per unit time, and then by the known, constant circumference "D" of the glue roll 7, 25 to compute the solids application rate 77, defined as the weight of solid starch applied to the medium's flute tips per unit time.

In the seventh step 78 the measured machine speed 79 is then multiplied by the known, variable width "E" of the manufactured corrugated board, that is dependent on the production order requirements, to compute the board production rate 80, defined as the surface area of board produced per unit time.

In the eighth and final step 81 the solids application rate 77 is then multiplied by the computed board production rate 80 to compute the final glue application rate 63, defined as the weight of solid starch applied per unit surface area of board produced.

Figure 7:
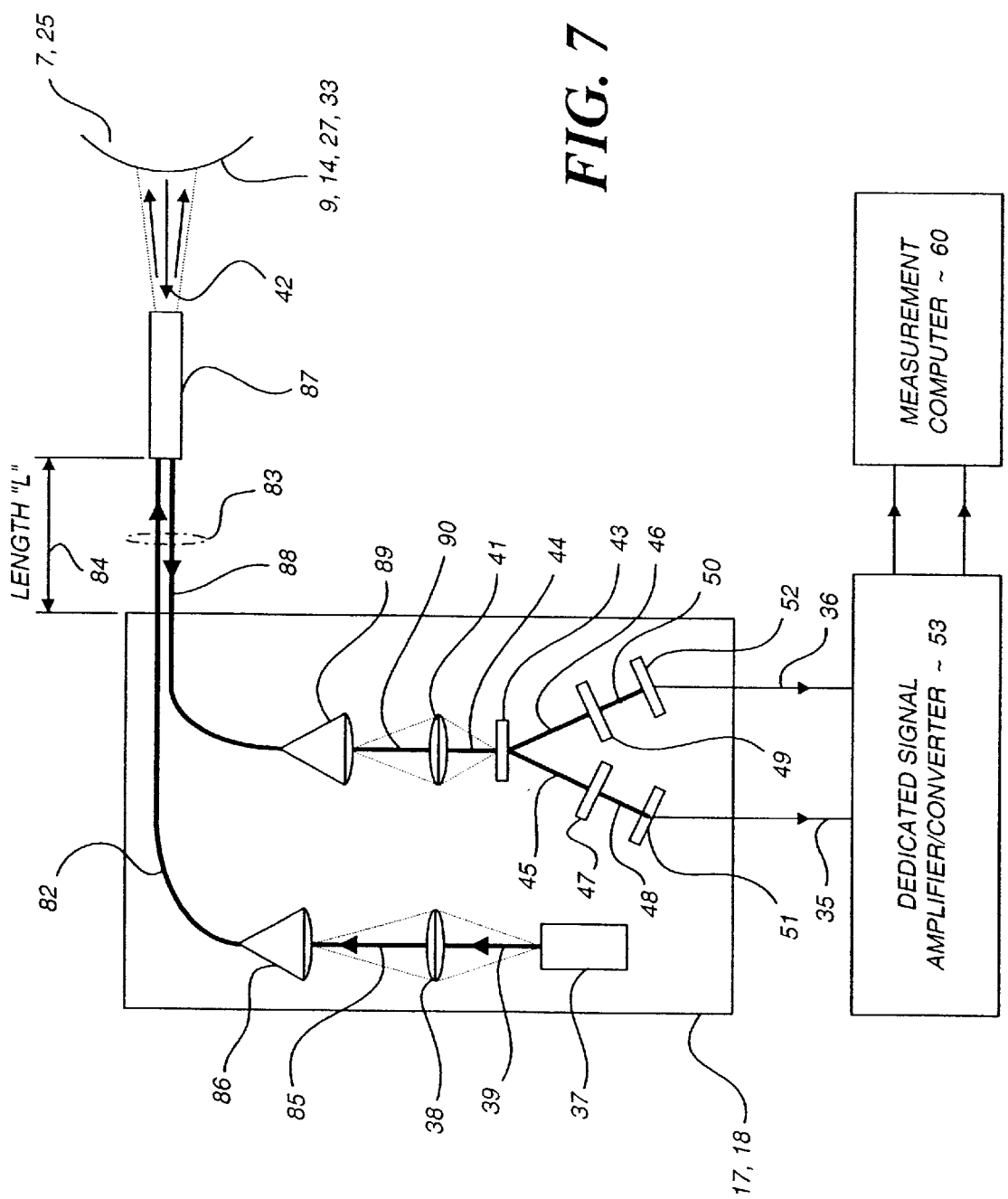
FIG. 7. is a schematic view of an infrared absorption sensor coupled with a remote fiber-optic probe, whose output signal is utilized in a preferred alternative embodiment of the system and method of the present invention.

Referring now to FIG. 7, a preferred enhanced embodiment of the system and method of the present invention employs a sensor 17, 18 that includes one or more source fiber-optic strands 82 that are contained within an external fiber-optic bundle 83 of length "L" 84 to convey the collimated source beam 85 from a source fiber-optic adapter 86 to a fiber-optic probe 87 that illuminates the glue film 9, 14, 27, 33 on the glue roll 7, 25. The sensor 17, 18 further includes an infrared lamp 37 that produces a diffuse source beam 39, a focusing lens 38 to collimate the diffuse source beam 39, the fiber-optic probe 87 to collect the returning, diffuse light beam 42 and convey it back to the sensor 17, 18 through one or more return fiber-optic strands 88 that are also contained within the external fiber-optic bundle 83, a return fiber-optic adapter 89 to convert the return light back into a second, returning, diffuse light beam 90, a second focusing lens 41 to collimate the second, returning, diffuse light beam 90, an optical beam splitter 43 to split the collimated, returning light beam 44 into two paths 45, 46, a first optical band-pass filter 47 to restrict the first filtered light beam 48 to a chosen narrow band-width, a second optical band-pass filter 49 to restrict the second filtered light beam 50 to a second chosen narrow band-width, a first light-sensitive detector 51 to measure the intensity of the first filtered light beam 48, a second light-sensitive detector 52 to measure the intensity of the second filtered light beam 50, a dedicated signal amplifier/converter 53 to initially process the low-voltage electrical output signals 35, 36 produced by the two light-sensitive detectors 51, 52, and a measurement computer 60 to perform required, additional measurement computations.

A first advantage of the preferred enhanced embodiment illustrated in FIG. 7 is that the length "L" 84 of the fiber-optic bundle 83 allows the sensor 17, 18 to be remotely located outside the width of the corrugator, where the sensor 17, 18 is protected from the harsh, on-machine, ambient environment of the corrugator.

Referring now to FIGS. 1, 2, 3 and 7, a second advantage of the preferred enhanced embodiment illustrated in FIG. 7 is the that the potential relatively smaller size and compact shape of the fiber-optic probe 87 allows the fiber-optic probe 87 to be more conveniently located adjacent to the glue roll 7, 25, in the close confines of the spaces formed by the juxtaposition of the corrugating rolls 2, the glue roll 7, 25, the metering roll 10, 28, and the glue pan 6, 24.

Figure 8:
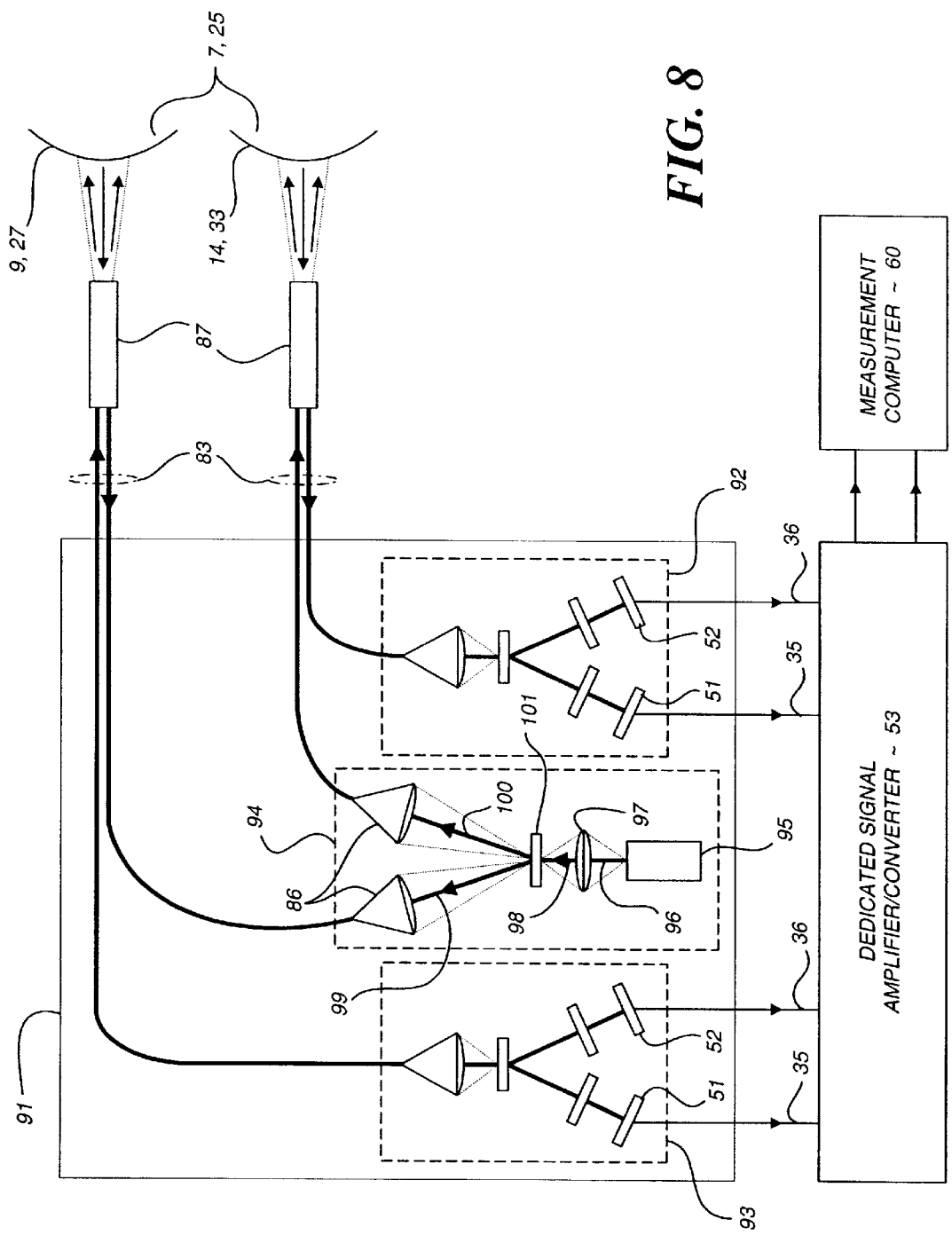
FIG. 8. is a schematic view of two combined infrared absorption sensors coupled with remote fiber-optic probes, whose output signals are utilized in still another preferred alternative embodiment of the system and method of the present invention.

Referring now to FIG. 8, a second preferred, enhanced embodiment of the system and method of the present invention employs a single, remote sensor enclosure 91, that encloses two detector assemblies 92, 93 one source light assembly 94, one dedicated signal amplifier/converter 53, one measurement computer 60, two fiber-optic bundles 83, and two fiber-optic probes 87 to combine the sensor components needed to measure both the upstream glue film 9, 27 and downstream glue film 14, 33 on the adjacent surface of the single glue roll 7, 25, using a single set of sensor components that are enclosed within a single, remote sensor enclosure 90.

The second, preferred enhanced embodiment illustrated in FIG. 8 further employs a single infrared lamp 95 to generate a single diffuse source beam 96 that is then passed through a single focusing lens 97. The single focusing lens 97 then generates a single collimated source beam 98 that is subsequently split into two identical, collimated, source beams 99, 100 by a single source beam splitter 101. The two collimated source beams 99, 100 are then conveyed through two respective, identical, source fiber-optic adapters 86 to two respective, identical, fiber-optic probes 87 that illuminate the upstream glue film 9, 27 and downstream glue film 14, 33 on the adjacent surface of the single glue roll 7, 25.

The second, preferred enhanced embodiment illustrated in FIG. 8 reduces the number of sensor components required to measure the thickness of both the upstream glue film 9, 27 and downstream glue film 14, 33 on the adjacent surface of the single glue roll 7, 25. The advantage of this approach is that it employs certain common components 95, 97, 101 to reduce the size and cost, and improve the inherent reliability and maintainability, of the implemented design of the system and method of the present invention. Sharing certain components 95, 97, 101 also ensures that the low-voltage output signals 35, 36 produced by the light-sensitive detectors 51, 52 will be inherently more consistent, as the same common components 95, 97, 101 are used to generate the single collimated source beam 98 that eventually illuminates both the upstream glue film 9, 27 and the downstream glue film 14, 33.

While the foregoing invention has been described with reference to its preferred embodiments, various alterations and modifications will occur to those skilled in the art. All such alterations and modifications are intended to fall within the scope of the appended claims.

What is claimed is:

1. A system for measuring thickness of glue film on a glue roll, wherein said system comprises a means for detecting thickness of glue film using a sensor employing the measurement principle of infrared absorption, and a means for producing an output signal indicative of said thickness of said glue film.

2. A system for measuring thickness of glue film on a glue roll upstream of a gluing nip, wherein said system comprises a means for detecting thickness of upstream glue film using a sensor employing a measurement principle of infrared absorption, and a means for producing an output signal indicative of said thickness of said upstream glue film.

3. A system for measuring thickness of glue film on a glue roll downstream of a gluing nip, wherein said system comprises a means for detecting thickness of a downstream glue film using a sensor employing a measurement principle of infrared absorption, and a means for producing an output signal indicative of said thickness of said downstream glue film.

4. A system for simultaneously measuring thickness of glue film upstream of a gluing nip on a glue roll, and also thickness of glue film downstream of a gluing nip on a glue roll, said system comprising:

means for simultaneously detecting both upstream and downstream glue film thicknesses using two sensors employing a measurement principle of infrared absorption;

means for producing an output signal that is indicative of said thickness of said upstream glue film and simultaneously producing a second output signal that is indicative of said thickness of said downstream glue film.

5. The system for simultaneously measuring upstream and downstream glue film thicknesses of claim 4 further comprising means for subtracting the output signal indicative of the downstream glue film thickness from the output signal indicative of upstream glue film thickness, said means computing the reduction in the glue film thickness arising from the intervening application of glue to a medium's flute tips.

6. The system for computing the reduction in glue film thickness of claim 5 further comprising means to convert said reduction in glue film thickness into a measurement of the weight of solid starch applied per unit surface area of board produced.

7. The system for measuring thickness of glue film on a glue roll of claim 1 further comprising a means to convey source light employed by said sensor, and a means to convey return light to said sensor, said means employing a fiber-optic bundle and a remote fiber optic probe.

8. The system for measuring thickness of upstream glue film of claim 2 further comprising a means to convey source light employed by said sensor, and a means to convey return light to said sensor, said means employing a fiber-optic bundle and a remote fiber optic probe.

9. The system for measuring thickness of downstream glue film of claim 3 further comprising a means to convey source light employed by said sensor, and a means to convey return light to said sensor, said means employed a fiber-optic bundle and a remote fiber optic probe.

10. The system for simultaneously measuring thickness of upstream and downstream glue films of claim 4 further comprising a means to convey source light employed by each said sensor, and a means to convey return light to each said sensor, said means employing one fiber-optic bundle and one remote fiber optic probe for each said sensor.

11. The system for simultaneously measuring thickness of upstream and downstream glue films of claim 4 further comprising a means to enclose the said sensors for measuring both the upstream and downstream glue films within a single enclosure, said system further comprising:

means for employing a single infrared lamp to generate a single diffuse source beam;

means for passing the single diffuse source beam through a single focusing lens, said single focusing lens generating a single collimated source beam;

means for subsequently splitting the single collimated source beam into two identical, collimated, source beams by employing a single source beam splitter;

means for conveying the two, identical, collimated, source beams through two respective, identical, source fiber-optic adapters to two respective, identical, fiber-optic probes, said fiber-optic probes simultaneously illuminating both the upstream glue film and downstream glue film on an adjacent surface of the single glue roll.

* * * * *